US012573008B2

(12) United States Patent
Sato

(10) Patent No.: US 12,573,008 B2
(45) Date of Patent: Mar. 10, 2026

(54) IMAGE PROCESSING APPARATUS AND METHOD, AND IMAGE CAPTURING APPARATUS

(71) Applicant: CANON KABUSHIKI KAISHA, Tokyo (JP)

(72) Inventor: Kazuki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 18/630,036

(22) Filed: Apr. 9, 2024

(65) Prior Publication Data

US 2024/0354900 A1 Oct. 24, 2024

(30) Foreign Application Priority Data

Apr. 18, 2023 (JP) ................................. 2023-068020

(51) Int. Cl.
*G06T 5/50* (2006.01)
*G06T 5/70* (2024.01)
*G06T 5/73* (2024.01)
(52) U.S. Cl.
CPC .................. *G06T 5/50* (2013.01); *G06T 5/70* (2024.01); *G06T 5/73* (2024.01); *G06T 2207/20221* (2013.01)

(58) Field of Classification Search
CPC .... G06T 5/50; G06T 5/70; G06T 5/73; G06T 2207/20221
See application file for complete search history.

(56) References Cited

FOREIGN PATENT DOCUMENTS

| JP | 2004219765 | A | * | 8/2004 |
| JP | 2004221992 | A | * | 8/2004 |
| JP | 2009194700 | A | | 8/2009 |
| JP | 2010124412 | A | | 6/2010 |

* cited by examiner

*Primary Examiner* — Jeffery A Brier
(74) *Attorney, Agent, or Firm* — Cowan, Liebowitz & Latman, P.C.

(57) ABSTRACT
An image processing apparatus includes a first acquisition unit configured to acquire a plurality of RAW images obtained by continuously capturing a subject, a combining unit configured to combine the plurality of RAW images to generate a combined RAW image, a second acquisition unit configured to acquire first information regarding a noise signal level in any of the plurality of RAW images not combined by the combining unit, a third acquisition unit configured to acquire second information regarding a noise signal level in the combined RAW image after the combine by the combining unit, and a determination unit configured to determine a development parameter for developing the combined RAW image based on capturing sensitivity of a capturing element when the plurality of RAW images are captured and the first information and the second information.

16 Claims, 6 Drawing Sheets

FIG. 3

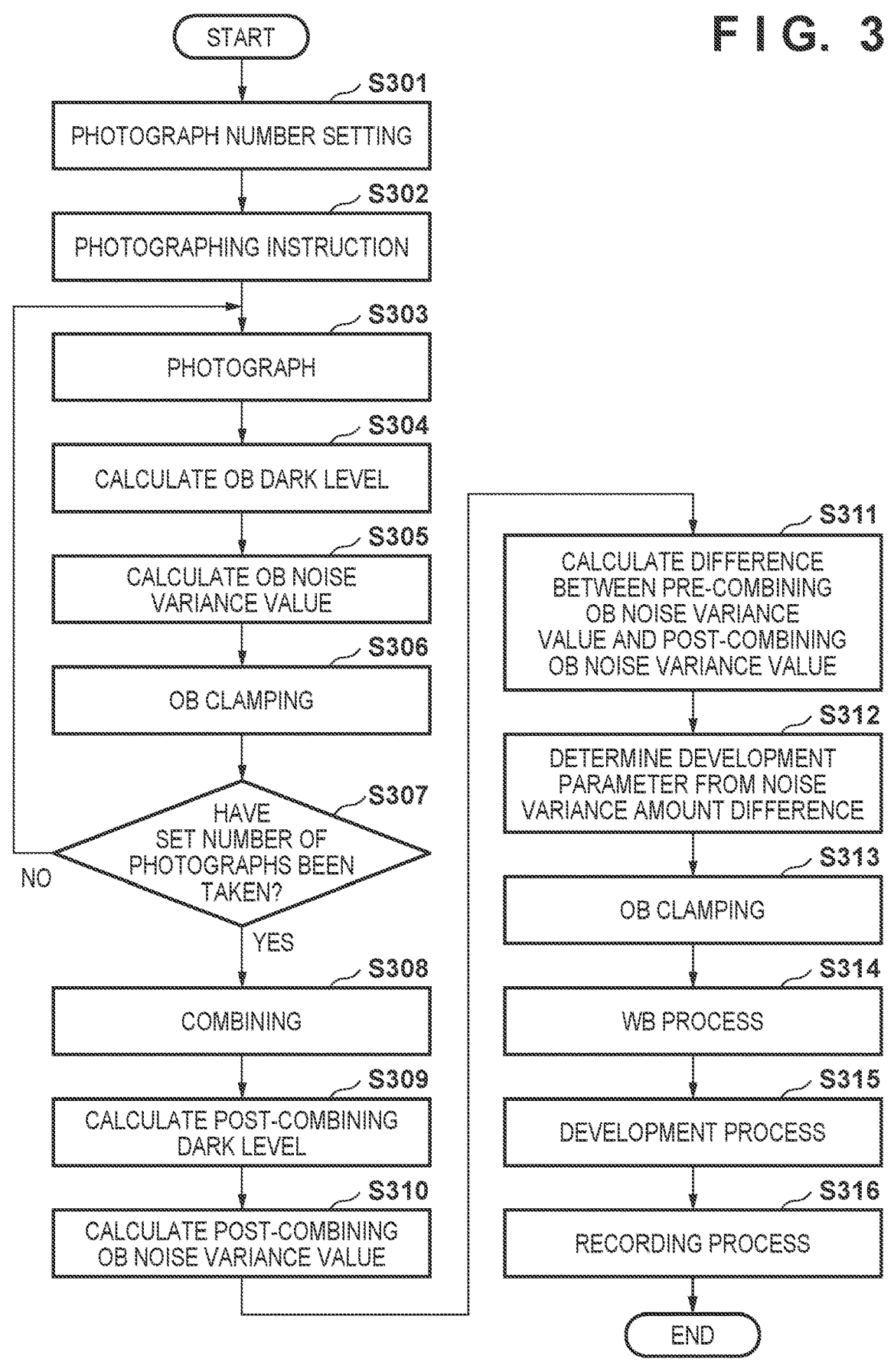

START

S301
PHOTOGRAPH NUMBER SETTING

S302
PHOTOGRAPHING INSTRUCTION

S303
PHOTOGRAPH

S304
CALCULATE OB DARK LEVEL

S305
CALCULATE OB NOISE VARIANCE VALUE

S306
OB CLAMPING

S307
HAVE SET NUMBER OF PHOTOGRAPHS BEEN TAKEN?

NO

YES

S308
COMBINING

S309
CALCULATE POST-COMBINING DARK LEVEL

S310
CALCULATE POST-COMBINING OB NOISE VARIANCE VALUE

S311
CALCULATE DIFFERENCE BETWEEN PRE-COMBINING OB NOISE VARIANCE VALUE AND POST-COMBINING OB NOISE VARIANCE VALUE

S312
DETERMINE DEVELOPMENT PARAMETER FROM NOISE VARIANCE AMOUNT DIFFERENCE

S313
OB CLAMPING

S314
WB PROCESS

S315
DEVELOPMENT PROCESS

S316
RECORDING PROCESS

END

F I G. 4
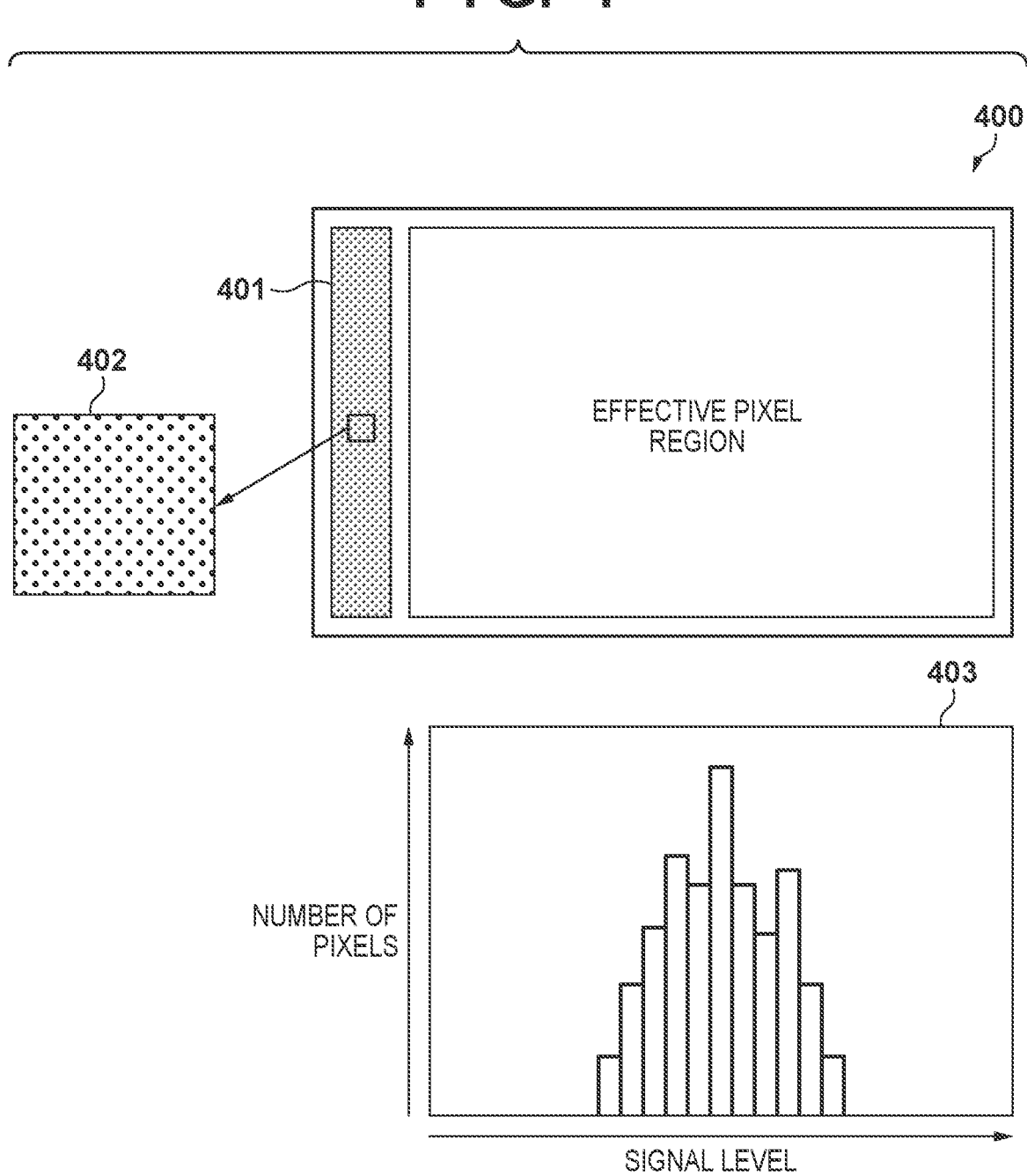

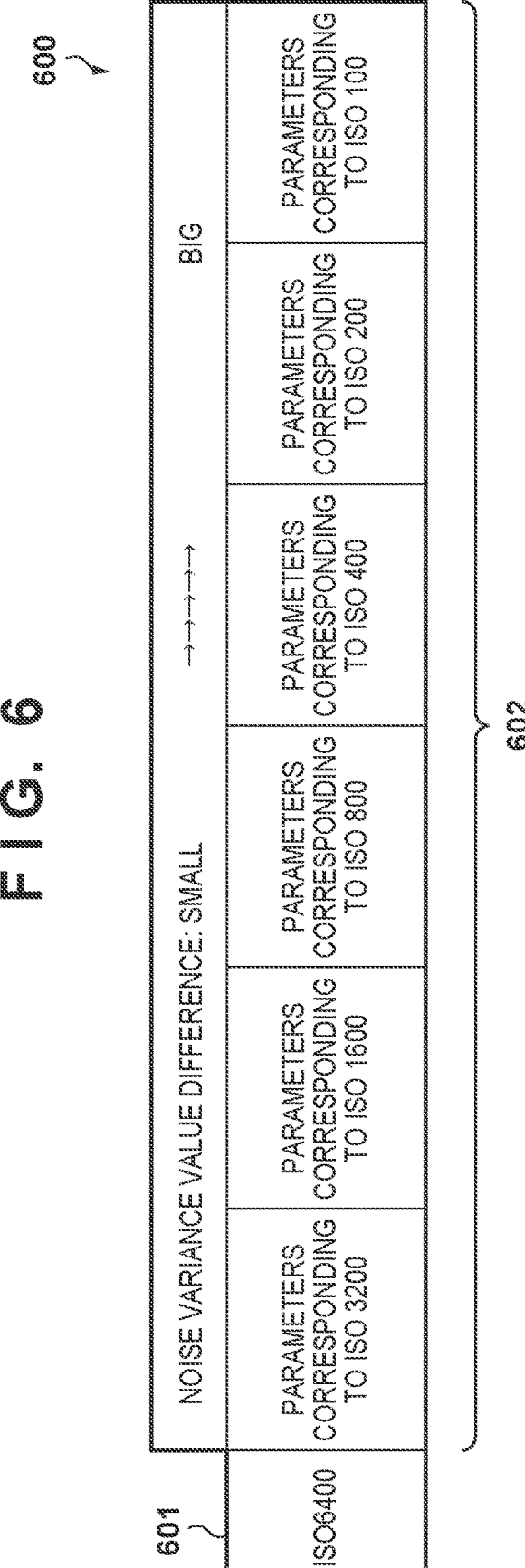
F I G. 6

IMAGE PROCESSING APPARATUS AND METHOD, AND IMAGE CAPTURING APPARATUS

BACKGROUND OF THE INVENTION

Field of the Invention

The present invention relates to image processing for generating one combined image by combining a plurality of RAW images.

Description of the Related Art

It is generally known that when photographing is performed with long-second exposure, image blur occurs due to shaking of the image capturing apparatus such as camera shake. As a method for correcting the image blur, there is a method of capturing a plurality of short-second exposure images by dividing a total exposure time, and combining these images to suppress the image blur.

When the total exposure time is divided, the exposure time per one time is shortened, and thus it is necessary to increase the sensitivity of the image capturing apparatus to perform photographing in order to obtain an image having an appropriate brightness. However, when the sensitivity of the image capturing apparatus is increased, the noise of the capturing element is amplified and an adverse effect that the quality of the image is deteriorated occurs.

In a case of developing a photographed RAW image, there is known a method of reducing noise by applying an appropriate development parameter to noise increased by making an image capturing apparatus highly sensitive. In this case, when the noise amount is increased by increasing the sensitivity of the image capturing apparatus, a stronger noise reduction parameter needs to be used. However, when a generally strong noise reduction parameter is used, a high-frequency component other than noise, such as an edge portion in an image, is also removed, and a problem that the sense of resolution of the image is impaired arises.

On the other hand, as a method of reducing noise, there is also a method called addition average combine in which a plurality of images are combined and averaged to make noise included in the image inconspicuous. When an image after development is set as a target of addition average combine, a noise reduction process is applied to the image after development at the time of development, and hence the deteriorated sense of resolution cannot be restored. For this reason, it is desirable to perform addition average combine on a RAW image, reduce noise, and then determine a noise reduction parameter in accordance with the amount of noise reduction, and perform development. However, in this case, there is a problem that the noise reduction amount is not known in advance.

Japanese Patent Laid-Open No. 2010-124412 discloses a technique for determining the intensity of noise reduction based on a photographing sensitivity at the time of acquiring a RAW image and a combine coefficient indicating the extent of using the RAW image for combine. However, in Japanese Patent Laid-Open No. 2010-124412, the photographing sensitivity and the combine coefficient are determined before photographing, and the noise reduction parameter cannot be determined in accordance with the noise reduction amount by the actual addition average combine.

Japanese Patent Laid-Open No. 2009-194700 discloses a technique for controlling a noise reduction parameter based on number of additions for image data generated by adding a plurality of images. However, even in this technique, the noise reduction parameter cannot be determined in accordance with the noise reduction amount by the addition average combine.

SUMMARY OF THE INVENTION

The present invention has been made in view of the problems described above, and provides an image processing apparatus that can reduce noise while suppressing deterioration in resolution in a case where a plurality of images are combined to obtain one combined image.

According to a first aspect of the present invention, there is provided an image processing apparatus comprising: at least one processor or circuit configured to function as: a first acquisition unit configured to acquire a plurality of RAW images obtained by continuously capturing a subject; a combining unit configured to combine the plurality of RAW images to generate a combined RAW image; a second acquisition unit configured to acquire first information regarding a noise signal level in any of the plurality of RAW images not combined by the combining unit; a third acquisition unit configured to acquire second information regarding a noise signal level in the combined RAW image after the combine by the combining unit; and a determination unit configured to determine a development parameter for developing the combined RAW image based on capturing sensitivity of a capturing element when the plurality of RAW images are captured and the first information and the second information.

According to a second aspect of the present invention, there is provided an image capturing apparatus comprising: at least one processor or circuit configured to function as: a first acquisition unit configured to acquire a plurality of RAW images obtained by continuously capturing a subject; a combining unit configured to combine the plurality of RAW images to generate a combined RAW image; a second acquisition unit configured to acquire first information regarding a noise signal level in any of the plurality of RAW images not combined by the combining unit; a third acquisition unit configured to acquire second information regarding a noise signal level in the combined RAW image after the combine by the combining unit; a determination unit configured to determine a development parameter for developing the combined RAW image based on capturing sensitivity of a capturing element when the plurality of RAW images are captured and the first information and the second information; and the capturing element.

According to a third aspect of the present invention, there is provided an image processing method comprising: acquiring a plurality of RAW images obtained by continuously capturing a subject; generating a combined RAW image by combining the plurality of RAW images; acquiring first information regarding a noise signal level in any of the plurality of RAW images that are not combined; acquiring second information regarding a noise signal level in the combined RAW image after the combine by the combining; and determining a development parameter for developing the combined RAW image based on capturing sensitivity of a capturing element when the plurality of RAW images are captured and the first information and the second information.

Further features of the present invention will become apparent from the following description of exemplary embodiments with reference to the attached drawings.

BRIEF DESCRIPTION OF THE DRAWINGS

FIG. 3 is a flowchart illustrating an operation of divided exposure photographing in the embodiment.

FIG. 4 is a diagram illustrating signal levels of an effective pixel region and an OB region.

FIG. 6 is a diagram illustrating an example of determining a parameter to be applied from a set capturing sensitivity and a difference in calculated OB variance values.

DESCRIPTION OF THE EMBODIMENTS

Figure 1:
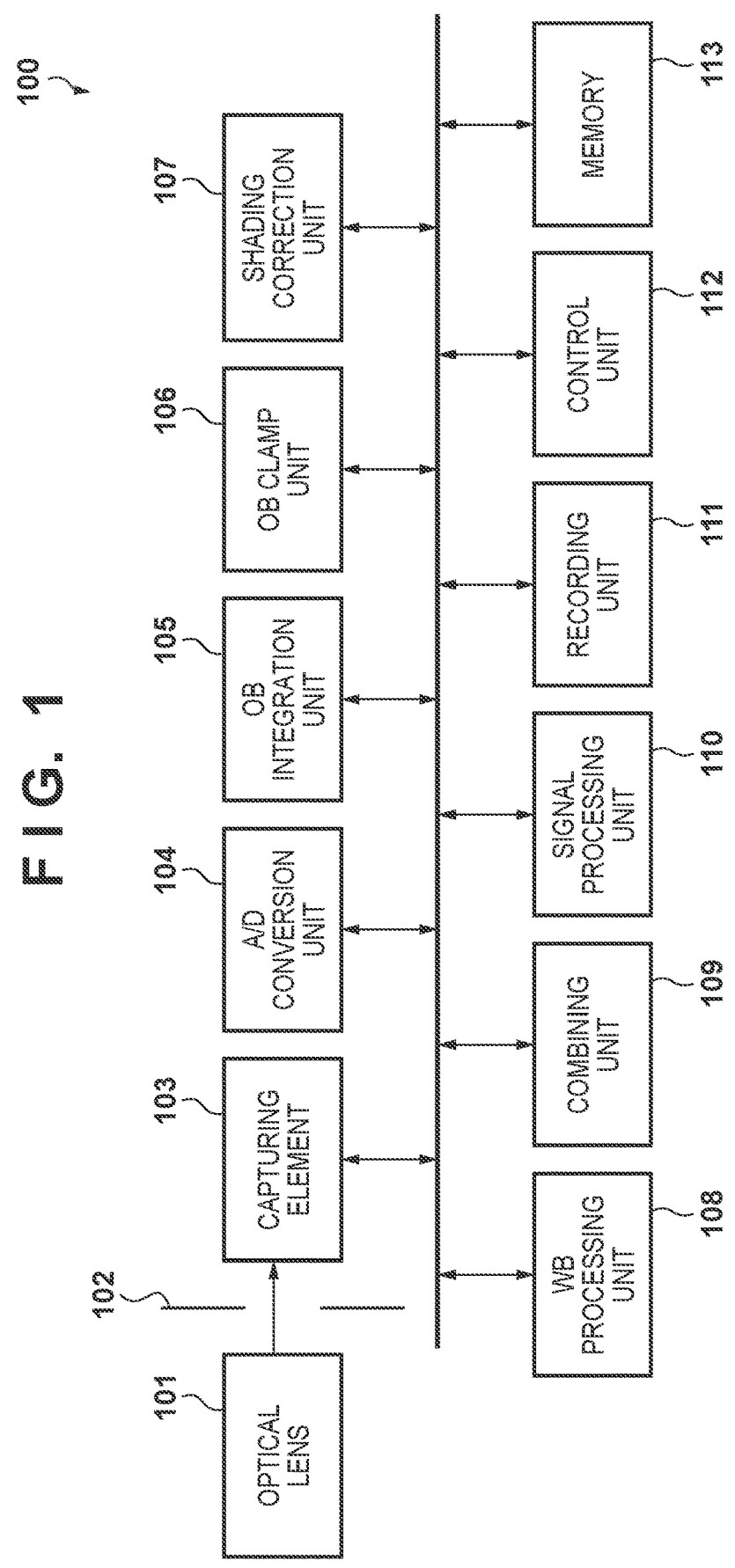
FIG. 1 is a block diagram illustrating a configuration of an image capturing apparatus which is an embodiment of an image processing apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating a configuration of an image capturing apparatus 100 which is an embodiment of an image processing apparatus of the present invention.

In FIG. 1, a light beam that entered an optical lens 101 passes through a diaphragm 102 and forms a subject image on a capturing element 103. The capturing element 103 photoelectrically converts the subject image and outputs an analog image signal. An A/D conversion unit 104 converts the analog image signal into a digital signal, and outputs digital image data. In the capturing element 103, color filters having a configuration of a Bayer array in which R (red), G1 (green), G2 (green), and B (blue) pixels are regularly arranged are arranged. The digital image data (RAW image data) output from the A/D conversion unit 104 is once stored in the memory 113. Note that the RAW image data in the present embodiment is image data that is not in a completed state, and also includes image data in which only a part of the process included in the development process to be described later is executed.

Figure 2:
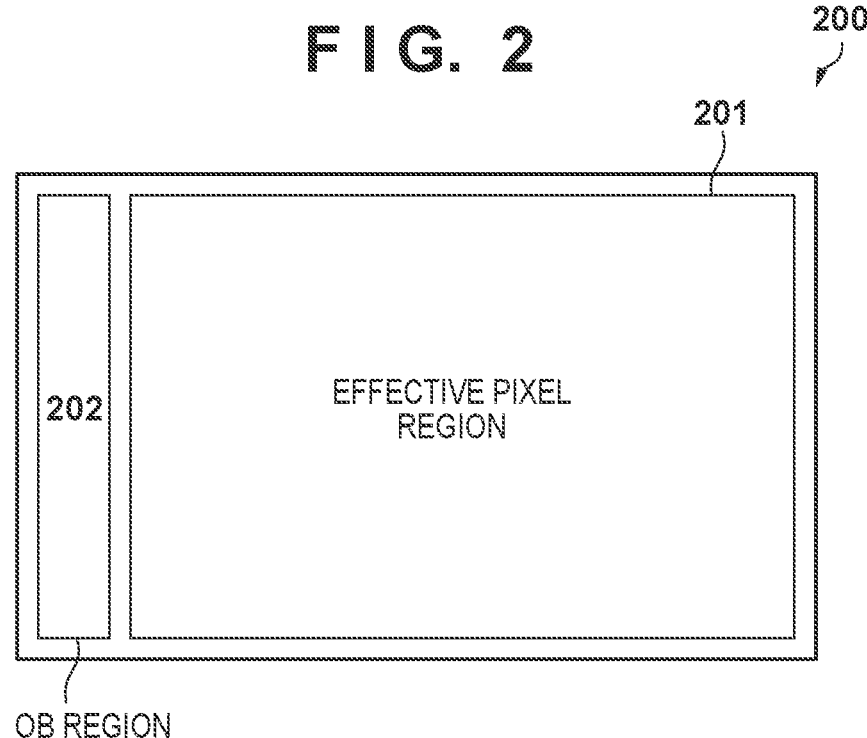
FIG. 2 is a diagram schematically illustrating a pixel array inside a capturing element.

FIG. 2 is a diagram schematically illustrating a pixel array inside the capturing element 103. As illustrated in FIG. 2, the capturing element 103 includes an effective pixel region 201 in which a photodiode that is a photoelectric conversion element is irradiated with light, and an optical black region (hereinafter, the OB region) 202 in which the photodiode is light-shielded from light by an aluminum thin film or the like. That is, the effective pixel region 201 is a non-light-shielded region, and the OB region 202 is a light-shielded region (light-shielded region). An OB integration unit 105 in FIG. 1 integrates the pixel values of the OB region 202 for each of R, G1, G2, and B of the Bayer array, and outputs an average value of the signals of the OB region. The output value of the OB integration unit 105 is set as a dark level (black level), and an OB clamp unit 106 performs OB clamping. This OB clamping process can prevent the occurrence of problems such as black floating and color shift.

Referring back to FIG. 1, the memory 113 stores RAW image data, image data processed by the signal processing unit 110, and the like. In addition, a control program or the like executed by the control unit 112 is also stored. A shading correction unit 107 corrects the luminance level in the screen with respect to the RAW image data, which is the digital image data from the A/D conversion unit 104, so as to correct shading caused by the aberration of the optical lens 101 or the characteristics of the capturing element 103. A white balance (WB) processing unit 108 performs a white balance process of adjusting a white reference in the screen to white with respect to the output image data from the shading correction unit 107. In the present embodiment, the shading correction is a correction for applying a gain to each pixel according to a two-dimensional coordinate (position) in the capturing element 103, and the white balance process is a process for applying different gains to R, G1, G2, and B of the Bayer array.

The combining unit 109 calculates and combines N RAW images photographed by divided exposure through an addition averaging method. The luminance value of each of the images before combine is $I\_i\,(x,\,y)$ ($i=1$ to N, x, and y represent coordinates in the screen), and the luminance value of the image after combine of the N images is $I\,(x,\,y)$. At this time, in the calculation by the addition averaging method, the luminance value $I\,(x,\,y)$ of the combine word is expressed with the following equation.

$$I(x, y) = (I\_1(x, y) + I\_2(x, y) + \ldots + I\_N(x, y))/N$$

Then, the luminance values of the N images are subjected to an addition averaging process for each pixel to obtain combined image data.

The signal processing unit 110 performs a development process including a color matrix process, a gamma process, a noise reduction process, and the like on the RAW image data and the RAW image data generated by combine by the combining unit 109. A recording unit 111 records the RAW image data, the combined RAW image data combined by the combining unit 109, the image data subjected to a development process by the signal processing unit 110, and the like. The control unit 112 performs a general control of the image capturing apparatus 100.

FIG. 3 is a flowchart illustrating an operation of divided exposure photographing in the present embodiment. The operation of this flowchart is realized by the control unit 112 executing a program stored in the memory 113.

In step S301, the number of images to be photographed for the divided exposure is set by the operation of the user. In the present embodiment, the total exposure time necessary for obtaining the appropriate exposure is divided, and a plurality of short-second exposure images are acquired, which images are combined later to obtain one combined image. As a result, it is possible to suppress image blur caused by shaking of the image capturing apparatus 100 such as camera shake in the long-second exposure.

In step S302, the user presses the shutter switch to give a photographing instruction.

Hereinafter, in steps S303 to S306, the control unit 112 performs continuous photographing until photographing of the number of photographing images set in step S301 is completed, and repeats saving of the RAW image while calculating the variance value of the noise signal level in the OB region of the captured RAW image.

More specifically, in step S303, the control unit 112 captures a RAW image in accordance with the photographing instruction in step S302, and saves the captured RAW image in the memory 113.

In step S304, the control unit 112 uses the OB integration unit 105 to calculate the dark level of the photographed RAW image (black level calculation).

In step S305, the control unit 112 calculates a variance value of the signal (first information regarding the noise signal level) from the signal in the OB region of the captured RAW image.

Here, FIG. 4 is a diagram illustrating signal levels of an effective pixel region and an OB region. A signal 401 indicates a signal obtained in a case where signal accumulation is performed with high sensitivity in the light-shielded OB region 202 of the capturing element 103. A signal 402 indicates a signal obtained by extracting a partial region of the signal 401.

Since the signal 401 is not affected by the light emitted to the capturing element 103, a component of random noise of the capturing element itself appears, and in a case where the signal is accumulated with high sensitivity, granular noise appears as in the signal 402. A graph 403 illustrates a signal level of a specific region in the signal 402 and a distribution of the number of pixels corresponding to the signal level. In step S305, a variance value (hereinafter also referred to as a variance value of the noise signal level or a noise variance value) is calculated from the signal level and the distribution of the number of pixels for each signal level with reference to a specific region such as the signal 402.

The signal 402 refers to a part of the OB region arranged in the vertical direction, but may refer to the OB region arranged in the horizontal direction. In addition, the entire OB region may be referred to without being limited to a part thereof.

In step S306, the control unit 112 executes OB clamping based on the dark level calculated in step S304 using the OB clamp unit 106.

In step S307, the control unit 112 determines whether or not the number of photographed images has reached the number of images to be photographed set in step S301. In a case where the set number of images to be photographed has been reached, the control unit 112 proceeds the process to step S308, and otherwise returns the process to step S303, and repeats steps S303 to S307 until the set number of images to be photographed is reached.

In step S308, the control unit 112 uses the combining unit 109 to addition average and combine the N RAW images photographed in steps S303 to S307. In consideration of a case where the signal value becomes less than or equal to zero due to the influence of noise in the negative direction by the combine, a dark level of a specific value may be added to the output of the captured RAW image and output. In the case of adding a fixed dark level, after the combine in step S308, a fixed dark level is subtracted from the combined RAW image.

In step S309, the control unit 112 calculates the dark level after the combine from the signal in the OB region of the combined RAW image.

In step S310, the control unit 112 calculates a variance value (second information related to the variance value of the noise signal level, the noise variance value, and the noise signal level) of the signal level in the OB region of the combined RAW image.

Figure 5:
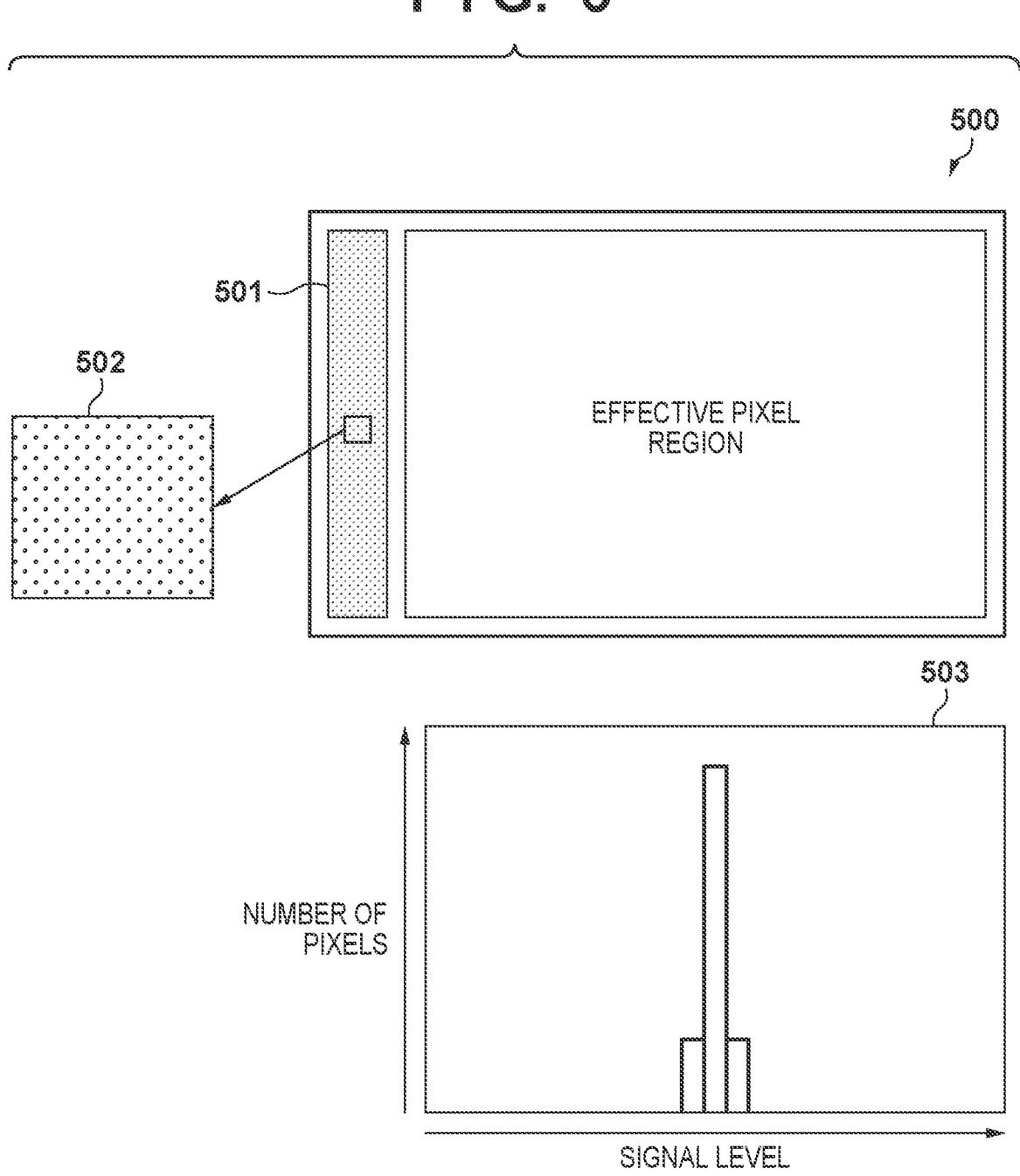
FIG. 5 is a diagram illustrating signal levels of an effective pixel region and an OB region of a combined RAW image.

Here, FIG. 5 is a diagram illustrating signal levels of an effective pixel region and an OB region of a combined RAW image. A signal 501 indicates a signal in which addition averaging is performed in the light-shielded OB region 202 of the capturing element 103 and noise is reduced. A signal 502 indicates a signal obtained by extracting a partial region of the signal 501. In the signal 501, since the random noise of the RAW data captured in step S303 is reduced by the addition averaging, the amount of granular noise is reduced. A graph 503 illustrates a signal level of a specific region in the signal 502 and a distribution of the number of pixels corresponding to the signal level.

Since the random noise is reduced in the OB region of the combined RAW image as in the signal 502 as compared with the OB region of one RAW image as in the signal 402, the distribution of the variance is smaller than that of the graph 403.

In step S311, the control unit 112 calculates a difference between the noise variance value of any one of the RAW images calculated in step S305 and the noise variance value of the combined RAW image calculated in step S310. As a result, it can be seen that the noise reduction effect by the addition averaging is small with respect to the RAW before combine when the difference in variance value is small, and it can be seen that the noise reduction effect is large when the difference in variance value is large.

In the present embodiment, the noise variance value of any one RAW image calculated in step S305 is used, but this may be the variance value of the first or last RAW image, or the variance value of any one RAW image being photographed excluding the first and last RAW images.

In step S312, the control unit 112 determines a development parameter to be applied to development from the difference in the noise variance values calculated in step S311.

Here, FIG. 6 is a diagram illustrating an example of determining a parameter to be applied from the set capturing sensitivity and the difference in the noise variance values calculated in step S311.

The ISO sensitivity is a guideline value for amplifying a signal of a capturing element in a digital camera, and noise is more likely to occur as the ISO sensitivity is higher. Reference numeral 601 indicates a set value of the ISO sensitivity set at the time of photographing, and reference numeral 602 indicates an example of the development parameter applied in step S311. As described above, as the noise variance value is smaller, the development parameter corresponding to the ISO sensitivity closer to the set ISO sensitivity is applied, and as the noise variance value is larger, the development parameter corresponding to the ISO sensitivity smaller than the set ISO sensitivity is applied. In this case, the parameter to be applied may be a parameter related to a noise reduction process or a parameter of sharpness to be applied to enhancement of an edge portion.

In step S313, the control unit 112 uses the OB clamp unit 106 to perform an OB clamping process using the dark level after combine calculated in step S309.

In step S314, the control unit 112 uses the WB processing unit 108 to perform WB processing on the combined RAW image after the OB clamping.

In step S315, the control unit 112 performs a developing process on the combined RAW image subjected to the WB processing in step S314. In the developing process, the development parameter determined in step S311 is applied to perform the developing process.

In step S316, the control unit 112 records the image developed in step S315 on an external storage medium such as an SD card. As the information to be stored at this time, not only the developed image but also the combined RAW image before OB clamping in step S313 may be recorded.

Furthermore, the dark level calculated in step S309 and the noise variance value calculated in step S311 may also be recorded, and the processes of steps S312 to S315 may be performed by an image processing apparatus other than the image capturing apparatus.

As described above, in the present embodiment, in the case of developing a RAW image in which noise has been reduced by addition averaging, the noise reduction effect by addition averaging is estimated from the difference between the noise variance value of one RAW image not subjected to the addition averaging and the noise variance value of the RAW image in which noise has been reduced by the addition averaging. Then, a development parameter suitable for the noise reduction effect is determined and applied to development. As a result, a development parameter having a noise reduction effect more than necessary is not applied to the addition averaged RAW image, and lowering in the resolution of the image after development can be suppressed.

Note that the method for determining the development parameter based on the information regarding the noise signal level of the RAW image that is not combined and the information regarding the noise signal level of the combined RAW image is not limited to the method using the difference in the variance values. For example, a difference in signal levels having the largest frequency in the distribution of the number of pixels for each signal level of the noise signal level may be used, or a difference in average values of the noise signal levels may be used. Furthermore, in the present embodiment, the N photographed RAW images are combined, but a part of the photographed RAW image may be excluded from the target to be combined and not combined. In that case, the development parameter may be determined based on the information regarding the noise signal level of the RAW image that is not to be combined.

Furthermore, in the above embodiment, a personal digital camera has been described. However, the present invention can also be applied to other devices such as a portable device, a smartphone, or a network camera connected to a server as long as the devices have a RAW combine function and a RAW development function. Alternatively, part of the processes described above may be performed by a portable device, a smartphone, a network camera connected to a server, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-068020, filed Apr. 18, 2023, which is hereby incorporated by reference herein in its entirety.

What is claimed is:

1. An image processing apparatus comprising:
at least one processor or circuit configured to function as:
a first acquisition unit configured to acquire a plurality of RAW images obtained by continuously capturing a subject;
a combining unit configured to combine the plurality of RAW images to generate a combined RAW image;
a second acquisition unit configured to acquire first information regarding a noise signal level in any of the plurality of RAW images not combined by the combining unit;
a third acquisition unit configured to acquire second information regarding a noise signal level in the combined RAW image after the combine by the combining unit; and
a determination unit configured to determine a development parameter for developing the combined RAW image based on capturing sensitivity of a capturing element when the plurality of RAW images are captured and the first information and the second information.

2. The image processing apparatus according to claim 1, wherein the combining unit generates the combined RAW image by addition averaging the plurality of RAW images.

3. The image processing apparatus according to claim 1, wherein
the capturing element includes an effective pixel region and a light-shielded region, and
the second acquisition unit and the third acquisition unit acquire the first information and the second information based on a signal obtained in the light-shielded region.

4. The image processing apparatus according to claim 3, wherein the second acquisition unit acquires the first information based on a signal of the light-shielded region in any of the plurality of RAW images, and the third acquisition unit acquires the second information based on a signal obtained by combining the signals of the light-shielded regions in the plurality of RAW images.

5. The image processing apparatus according to claim 1, wherein
the second acquisition unit acquires, as the first information, a first variance value of a noise signal level based on a distribution of a noise signal level in any of the plurality of RAW images, and
the third acquisition unit acquires, as the second information, a second variance value of a noise signal level based on a distribution of a noise signal level in the combined RAW image.

6. The image processing apparatus according to claim 5, wherein the determination unit determines the development parameter based on the capturing sensitivity and a difference between the first variance value and the second variance value.

7. The image processing apparatus according to claim 6, wherein the determination unit determines the development parameter to be a value corresponding to a sensitivity closer to the capturing sensitivity as the difference between the first variance value and the second variance value is smaller, and determines the development parameter to be a value corresponding to a sensitivity farther from the capturing sensitivity as the difference between the first variance value and the second variance value is larger.

8. The image processing apparatus according to claim 7, wherein the determination unit determines the development parameter to be a value corresponding to a sensitivity lower than the capturing sensitivity as the difference between the first variance value and the second variance value increases.

9. The image processing apparatus according to claim 5, wherein the second acquisition unit acquires the first information based on a first image of the plurality of RAW images.

10. The image processing apparatus according to claim 5, wherein the second acquisition unit acquires the first information based on a last image of the plurality of RAW images.

11. The image processing apparatus according to claim 1, wherein the second acquisition unit acquires the first information based on any of the plurality of RAW images before combine by the combining unit.

12. The image processing apparatus according to claim 1, wherein the second acquisition unit acquires the first information based on any of the plurality of RAW images that is not a target of combine by the combining unit.

13. The image processing apparatus according to claim 1, wherein the determination unit determines a parameter of a noise reduction process as the development parameter.

14. The image processing apparatus according to claim 1, wherein the determination unit determines a parameter of sharpness as the development parameter.

15. An image capturing apparatus comprising:
at least one processor or circuit configured to function as:
a first acquisition unit configured to acquire a plurality of RAW images obtained by continuously capturing a subject;
a combining unit configured to combine the plurality of RAW images to generate a combined RAW image;
a second acquisition unit configured to acquire first information regarding a noise signal level in any of the plurality of RAW images not combined by the combining unit;
a third acquisition unit configured to acquire second information regarding a noise signal level in the combined RAW image after the combine by the combining unit;
a determination unit configured to determine a development parameter for developing the combined RAW image based on capturing sensitivity of a capturing element when the plurality of RAW images are captured and the first information and the second information; and
the capturing element.

16. An image processing method comprising:
acquiring a plurality of RAW images obtained by continuously capturing a subject;
generating a combined RAW image by combining the plurality of RAW images;
acquiring first information regarding a noise signal level in any of the plurality of RAW images that are not combined;
acquiring second information regarding a noise signal level in the combined RAW image after the combine by the combining; and
determining a development parameter for developing the combined RAW image based on capturing sensitivity of a capturing element when the plurality of RAW images are captured and the first information and the second information.

* * * * *